UNITED STATES PATENT OFFICE.

OMER BENNETT, OF HORNELL, NEW YORK.

PROCESS OF MAKING A FERTILIZER COMPOSITION.

1,067,712.  Specification of Letters Patent.  Patented July 15, 1913.

No Drawing.  Application filed January 31, 1911.  Serial No. 605,779.

*To all whom it may concern:*

Be it known that I, OMER BENNETT, a citizen of the United States, residing at Hornell, in the county of Steuben and State of New York, have invented new and useful Improvements in Processes of Making a Fertilizer Composition, of which the following is a specification.

This invention relates to fertilizers, and its object is to provide a fertilizer which will keep the soil loose and porous for the absorption of moisture, destroy all germs or insects liable to attack the roots of the plant, retain a certain amount of moisture for the use of the plant, and generate and extract from the air and earth such substances as are useful and available for plant food and growth.

A further object of the invention is to provide a composition which may be used as an insecticide upon the exposed surfaces of the plants.

In carrying my invention into practice, I provide a composition of the following ingredients, to wit:—

Sulfate of iron (copperas)____ 25 per cent.
Chlorid of sodium (common salt),
_____ 50 per cent.
Lime (unslaked)_____ 25 per cent.

When ready to sow, the above composition is mixed with gypsum (calcium sulfate), 50 per cent.

The several ingredients of the composition are preferably combined by first thoroughly incorporating the unslaked lime with the salt, allowing the same to air-slake for a period of about twenty-four hours, then cooling the mixture if necessary, then stirring and mixing the same a second time, then adding and thoroughly intermixing the sulfate of iron therewith, and then grinding or reducing the mixture to a powder. As a result of this combination, the lime will be completely slaked, calcium hydroxid will be formed which will convert more or less of the sodium chlorid into sodium hydroxid, which uniting with the carbon dioxid of the atmosphere will form sodium carbonate. The composition thus formed, just before applying to the soil is mixed with the ground gypsum in proportions above stated. In use, the composition is spread over the surface of the ground or about the plants and combined with the soil in any of the usual ways.

This composition also acts upon certain of the rocks and disintegrated portions of the same in the soil and frees the potash therein for use and absorption by the plants, thereby at the same time loosening up the soil. It has a strong affinity for moisture, and collects and retains the same to a considerable extent. It further destroys certain insects and their larvæ which would otherwise feed upon the roots of the plant. By sprinkling it dry upon the exposed surface of the plant, it may be used as an effective insecticide. A solution of lime, salt and sulfate of iron in water may be used for this purpose.

By the combination of the ingredients in the proportions named, and the method of manufacture set forth, an important advantage is obtained over prior fertilizers of this particular character, in that by slaking the lime in the manner described with the salt, and thus forming calcium hydroxid, all of the active constituents of the mixture will be retained and the chemical composition changed so that there will be no free particles of lime left which would be apt to burn and destroy the growing vegetation, an objection incident to all fertilizers in which the lime is slaked by the action of water. Moreover, a composition made as hereinbefore described is available for immediate use, whereas ordinary compositions of this character must be stored, often for lengthy periods, in order to allow of the proper chemical action of the respective ingredients upon one another.

Having thus described my invention, I claim:—

1. The herein described method of making a fertilizer, which comprises mixing unslaked lime with common salt, and allowing the mixture to air-slake for about 24 hours; then adding iron sulfate and thoroughly mixing the mass by grinding; allowing the mixture to stand for a time, and then mixing with gypsum.

2. The herein described method of making a fertilizer, which comprises mixing 1 part of unslaked lime with 2 parts of common salt, and allowing the mixture to air-slake for about 24 hours; then adding 1 part of iron sulfate and thoroughly mixing the mass by grinding; allowing the mixture to stand for a time, and then mixing with 2 parts of ground gypsum.

In testimony whereof I affix my signature in presence of two witnesses.

OMER BENNETT.

Witnesses:
 MILO M. ACKER,
 M. C. ALMY.